United States Patent Office 3,224,886
Patented Dec. 21, 1965

3,224,886
METHOD OF PREPARING FLAVOR IMPROVED PRESERVED FRUIT
Werner J. Motzel and Fredric J. Baur, Cincinnati, Ohio, assignors to The Procter & Gamble Company, Cincinnati, Ohio, a corporation of Ohio
No Drawing. Filed Sept. 6, 1962, Ser. No. 221,887
2 Claims. (Cl. 99—204)

This invention relates to the preservation of foods, and more specifically, it relates to a fruit preservation process which preserves essentially the original natural flavor of said fruit, and the products obtained by said process.

A great many foods can be obtained only at a certain time of the year or only over a relatively short period. Since the need for food is constant, attention has for millenia been focused on the problem of preserving foods so that they can be consumed some time after they are harvested or otherwise obtained. At first, mere retention of something with edible value was the aim of food preservation. Today however, mankind's improved methods of preservation and its taste for fresher foods has changed the focus to the problem of securing fresher and more natural flavor in the preserved foodstuff.

A number of methods are known for the preservation of fruits. These include drying of various types, canning, cooking with large quantities of sugar, and freezing. In general, none of these methods is capable of completely retaining the natural flavor of all fruits. Delicate flavors, such as strawberry, have been found to be particularly elusive.

Quick-freezing has become a widely-used method for preserving fruits with some modicum of their natural flavor. This method, while productive of generally satisfactory results, creates problems of storage. If the preserved fruit is not maintained at a sufficiently low temperature, many of the advantages of the quick-freezing are lost. Thus, expensive storage facilities are needed to keep the frozen fruit until the time it is to be consumed. The fruits also contain their original content of water which contributes to higher freight costs.

Freezing also presents certain other problems. For instance, it is frequently desirable to incorporate fruit into cakes, pies, rolls, and the like to act as a flavoring ingredient. If these edible products are to be packed in the form of a mix which includes the fruit-flavoring material, it is a tremendous burden to keep the entire mix at sub-freezing temperatures. To do this would destroy much of the convenience of a prepared mix.

One of the most convenient forms in which to include fruit in a prepared culinary mix is that in which the fruit is dehydrated. When this is done, the fruit can be incorporated directly into the mix, either in a separate packet or interspersed throughout the other ingredients of the mix. While the prior art has been successful in preserving fruits by dehydrating them with various means, generally the flavor has suffered. Indeed, frequently the flavor of the dried fruit is so different from the fresh flavor as to bear little relation to said fresh flavor.

Some of the more sophisticated drying means, such as "freeze-drying," produce a product which fairly accurately reproduces the original appearance of the dried fruit, but even this method leaves something to be desired with respect to the fresh flavor. This drying method has a fault which is also common to far less sophisticated drying methods: a substantial portion of the substances which create the flavor of the fruit are considerably more volatile than water. Thus, these more volatile substances escape the material before the desired quantity of water has been removed. This being the case, no known method of dehydration, regardless of how complex it is or at how low a temperature it is carried out, will retain the flavor-producing substances which are equally as volatile or more volatile than water.

It is known from U.S.P. 2,924,521, Hewitt et al., issued February 9, 1960, to prepare enzyme extracts, known as "flavorese enzymes," which are effective in reproducing some of the original flavor constituents. This patent teaches that a food contains "flavor precursors" which survive the processing of the food and that enzyme materials can be extracted from the food, which enzymes are capable of influencing the flavor precursors to enhance the flavor and odor of the processed food. While these flavorese enzymes are very successful in recovering the tang of a system with only a few essential components, such as the system of the Cruciferae family, more complicated flavor systems are not so successfully reclaimed. Another disadvantage inherent in prior art methods of utilizing flavorese enzymes is that in many cases, especially for fruits, the enzymes have been obtained directly from the edible flesh of the fruit. This means that one must start out with considerable additional fruit beyond what is to be preserved so that sufficient enzyme extracts can be prepared. Such a procedure multiplies the raw material cost considerably.

It is therefore an object of this invention to preserve fruit by drying, such preservation permitting reconstitution of the fruit essentially to its natural flavor.

Another object of this invention is so to treat the fruit that its essential, natural fresh flavor can be restored by enzymes obtained from the products normally discarded as waste in the preparation and preservation of said fruits.

A further object of the instant invention is a process for the preservation of fruit to be incorporated into prepared culinary mixes of various types.

Other and further objects and achievements of the instant invention will be apparent to those skilled in the art after they have read and understood the following description.

The foregoing objects are achieved by the process of separating the edible fleshy portion of the fruit from the waste materials; treating the fleshy portion of the fruit in a suitable form with a sweetening material selected from the group consisting of monosaccharides, disaccharides, and hexitols, so that the sweetening material infiltrates the fleshy portion; dehydrating the treating fleshy portion to a moisture content of not substantially more than 15%, by weight; extracting flavorese enzyme from the fruit waste materials; and drying the enzymes so obtained to a moisture content of below about 5%, by weight. When water and the enzymes are added to the suitably dehydrated fruit, the reconstituted dried fruit will be found to have essentially the flavor of the original fresh fruit.

A wide variety of fruits can be treated according to the processes of the instant invention. Examples of fruits are the berries (such as strawberries and raspberries), pomes (such as apples), drupes (such as peaches), and various tropical and sub-tropical fruits (such as pineapples and bananas).

The fruit is prepared by removing the waste materials, such as skin, rind, core, and leafy petals, from the edible flesh of the fruit. This operation is very well known in the culinary art and is not especially critical. This separation of the waste material from edible flesh can be carried out as a hand operation, such as would be used for peeling bananas, or by mechanical means, such as an abrasive removal of the skin from apples. Since enzymes are to be recovered from the waste materials, the flesh should not be separated from the waste materials by a harsh chemical treatment, such as the peeling of peaches with a hot lye solution. In general, any mechanical method of separating the flesh from waste material is suitable.

The next step in the process is the treatment of the edible flesh of the fruit with sweetening material so that said flesh is essentially entirely infiltrated. For illustrative purposes, sucrose has been selected as a specific sweetening material in the following detailed description. In general, the fruit can be soaked in a 40%–70% sucrose solution or it can be covered with about 20%–25% by weight of sucrose in a suitably comminuted form. For instance, when solid sucrose is added, it may be in finely granulated or powdered form. While the broad range of solution concentrations capable of giving acceptable results is from about 40% to 70%, in general a higher concentration produces a higher natural flavor level in the finished product. Also, less water will be introduced into the product at a given sugar level, thereby requiring less dehydration time during subsequent processing. For this reason a minimum of a 60% solution is to be preferred. The upper level of sucrose solution concentration is set by the solubility of sucrose in water, the said upper limit being in the neighborhood of a 70% solution.

As has been heretofore stated, other monosaccharides and also disaccharides and hexitols can be used in the practice of this invention. As an example, it is possible to use fructose, glucose, maltose or lactose, and also sorbitol, dulcitol, or mannitol to treat the fruit flesh. Polysaccharides or starch were found to give no benefit when used in the process of this invention. Since sucrose is superior to the other lower sugars, the preferred embodiment of this invention utilizes sucrose to treat the fruit.

Treatment of the fruit flesh with sweetening material is an absolutely essential step in the process of this invention. If the enzyme treatment hereinafter described is attempted to be used on fruit flesh which has not been treated with sweetening material, the flavor of the fresh fruit will not be recaptured. The enzyme treatment on a substrate of fruits which have not been treated before dehydration will give an improved flavor, but it will not approach that of the fresh fruit in the manner of the present invention. For this reason, commercially dehydrated fruit has been found not to be suitable for treatment with the enzymes as hereinafter disclosed.

The fruit must be subjected to the action of sweetening material for a least a sufficient time to permit substantial infiltration of the fruit. A period of 20 minutes has been found to be sufficient. A period of 30 minutes at sucrose concentrations of about 60% to 70% is about optimum for the process. It is possible to utilize longer periods of time for soaking the fleshy portion of the fruit, but the results obtained are not materially enhanced, and the longer period merely results in a need for more equipment and in having more material in process. In order for the treatment to be caried out with greater facility, it is helpful to subdivide fruit flesh which has a minimum average dimension greater than ½ inch or so into pieces which have a minimum dimension which falls below this limit. For instance, in treating bananas, they can be handled in the form of slices ⅛-inch thick; for pineapple, ⅜-inch cubes have been satisfactory. The fruit flesh can also be very highly comminuted or it can be pulped so as to reduce it to a purée. Indeed, for some applications of the product of this process, the puréed form is preferred.

When the fruit flesh is reduced to a pulp or purée, the sweetening material can more readily be incorporated. The requisite amount of sweetening material can be added to the fruit flesh after the waste materials have been removed and the fruit can be reduced to a pulp in the presence of the sweetening materials.

As is known to those skilled in the art, some fruits darken or otherwise change deleteriously when they are exposed to air after their integuments are removed. Frequently such deleterious changes take place more rapidly when the fruit is reduced to purée form. For this reason, it is always helpful, and sometimes necessary, to incorporate a protective substance, such as ascorbic acid, into the fruit. For example, about 0.5%, by weight, ascorbic acid added to bananas prevents deterioration before drying. This can be conveniently done by adding the ascorbic acid to a solution of sweetening material in which the fruit is soaked, or by adding it to solid sweetening material before the fruit flesh is pulped. In general, about 0.1% to 1.0% ascorbic acid will give satisfactory results. If the sweetening material is to be added subsequent to pulping of the fruit (when the purée form is desired), it may be advisable to treat the fruit flesh preliminarily with a solution of preservative material.

It may in some instances be desirable to subject the fruit to a bleaching agent such as sulphur dioxide. Frequently, a treatment with sulphur dioxide will be found to fade the color of the fruit slightly (in the levels desired for use for this invention), but will prevent further fading of the fruit after it has been dehydrated.

The next step in the process is dehydration of the fruit flesh so that when dried it contains substantially not more than 15% water by weight. For best results, a water content of about 2% to about 7% is preferred. The drying operation should be so carried out that substantially all enzymatic activity in the fruit flesh is terminated.

The method of dehydrating the fruit flesh after it has been treated with sweetening material is not critical. Desirably, the temperature of the drying medium should be kept as low as possible, and it is preferable that it not exceed about 170° F. However, some fruits are less sensitive than others, and for these the preferred temperature limit could be increased somewhat beyond 170° F.

One method which has been used very successfully is drying of the treated fruit flesh in a forced draft oven. Air temperatures in the range of from about 115° to about 170° F. have been used. The more economical dehydration range appears to be from about 140° to 155° F. because optimum product quality is combined with a relatively short time.

Another method which has been used with great success is freeze-drying. This involves drying of frozen fruit flesh under pressure below about one millimeter of mercury.

As disclosed above, the final moisture level should not be substantially greater than about 15% by weight. If the moisture level is higher than this, deleterious changes will take place in the fruit flesh during storage. A greater amount of water will permit the browning reaction to take place, and of course, a high moisture level is conducive to the growth of microorganisms and molds in the product.

Freeze-drying is advantageous where it is desired to keep the fresh fruit in large, recognizable pieces, since such large pieces of freeze-dried fruit flesh reconstitute more rapidly when water is added than does the hot-air, atmospheric-pressure, forced-draft dried product. When purées are dried, speed of reconstitution is less of a problem, and there is less basis for choosing between the various drying methods. Obviously, methods which duplicate the conditions of the forecited forced-draft drying and freeze-drying can be used to good effect in the practice of this invention.

It should be mentioned that, when fruit flesh is soaked in a solution of sweetening material, drying time can be shortened considerably if the slices are permitted to drain free of excess solution before the drying operation has commenced. For instance, when forced-draft dehydration is used at a temperature of 155° F. (the fruit flesh having first been soaked for 30 minutes in a 70% sucrose solution), the time of drying to the same moisture content end point can be shortened from about 36 down to about 24 hours if said fruit is permitted to drain for 30 minutes. Naturally, the length of time required to dehydrate the fruit flesh to a desired moisture level various with the fruit, its physical form, its original moisture content, and other factors; but in general, a period of about 24 hours can be regarded as usual, although 5 hours may be sufficient under optimum conditions.

As has hereinbefore been disclosed, substantially all enzymatic activity should be arrested to prevent deterioration of the dehydrated fruit during storage. When the relatively high-temperature forced-draft drying is used, the enzymes are usually inactivated during the drying operation itself. The temperatures during freeze-drying generally do not rise high enough to assure that all enzymatic activity has been stopped, and it is frequently desirable to blanch the fruit flesh before freeze-drying is commenced. Placing the fruit flesh in a forced-draft oven for about 5 minutes at about 165° F. has been found to be sufficient to inactivate the enzymes. Failure to inactivate the enzymes will result in deterioration of flavor in the finished product.

While the flavorese enzyme extraction step of the process is described subsequent to dehydration of the fruit flesh, it may be, and generally is, desirable that the enzyme materials be processed contemporaneously with the processing of the fruit flesh. Briefly, the enzymes are extracted by comminuting the waste materials, extracting them with water, and precipitating the enzymes. The techniques of enzyme chemistry are used for the extraction. Those skilled in this art are undoubtedly familiar with and will be guided by the teachings of U.S.P. 2,924,521, Hewitt et al., issued February 9, 1960.

The procedure is one of mixing the waste materials removed from the fruit flesh with an equal or slightly greater weight of water and comminuting the mixture very finely. A blender, such as the Waring Blendor, has been found to be useful for this operation. After the waste materials have been reduced to a slurry in water, the liquid is separated from the solids which have settled out. The separation may be accomplished by such well-known means as settling and decantation, centrifugation, or filtration.

The supernatant liquid or filtrate so obtained is then subjected to the action of a protein-precipitating reagent. Reagents such as ammonium sulfate, alcohol, or acetone may be used. It has been found that ammonium sulfate does not produce as desirable an enzyme preparation as does acetone or alcohol and it has the further disadvantage that the precipitate must be dialyzed against water to separate it from said sulfate. Therefore, acetone and alcohol are the preferred reagents because of their properties and availability. The enzyme-precipitating reagent is added in an amount to precipitate the bulk of the dissolved enzyme, the addition of alcohol or acetone to produce a concentration of about 50% to about 60% having been found sufficient.

After the enzyme materials are precipitated, they are separated from the supernatant liquid. Again, this can be done by ordinary settling, by centrifugation, or by filtration. Difficulty may be experienced with the blocking of the pores of the filter by the precipitate, so that centrifugation or settling are advisable. The precipitate is then dried to a moisture content of less than about 5%. In order for the enzyme preparation to retain its activity, it should not be subjected to high temperatures during drying. For this reason, freeze-drying is the method of choice for the enzyme.

It is of course possible to subject the crude enzyme extract to further purification or to attempt to isolate some fraction thereof by partial precipitation accomplished by adjusting the concentrations of the precipitating reagents. It has been found, however, that the use of a crude enzyme extract from the waste materials produces considerably better results than a more sophisticated extract or the enzymes obtained from the fruit flesh itself.

Use of the product of the process of this invention involves the addition of sufficient water to rehydrate the dried fruit flesh, addition of enzyme obtained from the waste product to the mixture, and permitting the enzyme to act upon the substrate, whereupon the natural flavor of the dehydrated fruit is obtained. The addition of water to the dehydrated fruit pulp is not critical. It is more conveniently accomplished with water at room temperature, although it may be done with chilled water. The use of warm water at, say, temperatures above about 120° F. is inadvisable because one begins to obtain a cooked flavor in the reconstituted fruit. Also, as the temperature is raised, a point is reached at which the enzyme is inactivated and the advantages of this invention are less. The time required for rehydration will vary with the particle size of the pieces of dried fruit (or the physical state of the dried purée), the particular fruit involved, and the method of drying which has been used. When free-drying is used, even large fruit chunks rehydrate within not more than five minutes.

The enzyme may be added to the dried fruit flesh before the water of rehydration is added, the enzyme may be dissolved in the water of rehydration or a portion of it, or the enzyme may be added while the fruit flesh is rehydrating or after it has rehydrated. It is generally convenient to add the enzyme to the dried fruit flesh just before rehydration or just after the water of rehydration has been added, so that the enzyme flavor development and rehydration of the fruit flesh take place simultaneously. Since the enzyme acts upon the substrate in the presence of water, it is generally desirable to store the enzyme separately from the dehydrated fruit flesh until reconstitution.

It has been found that full flavor development generally does not take place unless about 50 mg. of enzyme are added to each 100 g. of dehydrated fruit flesh. A greater quantity of enzyme may be added, but it has no added effect upon the development of the flavor in the substrate. It is therefore recommended that the aforesaid ratio of about 50 mg. for every 100 g. of dried fruit flesh be maintained, since it is costly to use too much enzyme.

The amount of water used to reconstitute the dried fruit flesh will generally be equal to the amount of water removed, where the physical characteristics of the original fruit are desired. For instance, pineapple fruit comprises about 85% water. On reconstitution of the dried fruit flesh containing 5% to 10% moisture, water in the amount of about 5.5 times the weight of the dehydrated fruit should be added properly to reconstitute the pineapple properly. When, as hereinbelow discussed, the fruit flesh is reconstituted by incorporating it into a batter, it may or may not be desirable to add extra water to the batter. Naturally, less water may be added to the dehydrated fruit pulp if the effect of a candied fruit is desirable. Even if insufficient water is added so that the forecited candied-fruit texture is obtained, the fruit flesh treated with enzyme will nevertheless have the full flavor of the fresh fruit.

While the product of this process reconstitutes to make a fruit which is fully acceptable for eating by itself or in admixture with other reconstituted dried fruit flesh treated in accordance with the process of this invention, the product of this invention is especially useful for prepared culinary mixes. Thus, it may be incorporated into a cake mix and impart its fresh fruit flavor to the finished cake.

Those skilled in the art will realize that the product of this process has manifold possibilities for use, not only in place of fruit in conventional products, but also for products heretofore unattainable. The product is useful in frostings, ice cream, cookies, pralines, and other types of confections. The following examples, while illustrative of the manner in which the process of this invention may be carried out and of the uses of the product of said process, are not to be considered limitative.

*Example 1*

790 g. of bananas with a ripeness of 7 on the United Fruit Banana Ripeness Scale, "Banana Ripening Manual," publ. Fruit Dispatch Co., New York City, 1956, p. 9, are peeled and sliced transversely to the long axis of the banana into ⅛-inch sections. 600 g. of these slices are soaked in a 65% sucrose solution for 30 minutes, removed from the solution, and drained. As a control, 500 g. of bananas are peeled and sliced similarly. This second batch is not treated with sucrose.

The slices are then placed in a forced draft-hot air oven at a temperature of 165° F. for 5 minutes to blanch them. The blanched banana slices are placed in a freeze-dryer at a pressure of 50 microns of mercury with a coil temperature of −40° F.

The 190 g. of peels from the bananas are pulped in a blender and 500 cc. of water is added. The mixture is agitated and then permitted to stand for one hour. The supernatant liquid is then decanted and ethyl alcohol is added in the amount of 166% of the weight of the supernatant liquid to produce a 60% alcohol solution. The solution is agitated to insure thorough mixing and is then permitted to stand at a temperature of 40° F. The precipitate which forms is separated from the liquid by centrifugation and dried under a pressure of about 75 cm. of mercury. The prepared materials are stored separately for 4 months at 70° F. in moisture vapor-proof containers. One of the best materials of construction for the containers is a Saran-Mylar-polyethylene laminate.

At the end of this time a portion of the sucrose-treated bananas is reconstituted by adding 45 g. of water to 15 g. of the dried banana slices. Another batch of sucrose-treated bananas is reconstituted by adding 45 g. of water to 15 g. of banana slices and then adding 8 mg. of the enzyme powder. The third batch of reconstituted banana is made by adding 45 g. of water to 15 g. of the banana slices which are not sucrose-treated and then adding 8 mg. of the enzyme powder. Each batch was allowed to stand for 10 minutes, and the reconstituted bananas were inspected and flavored.

The flavor of the reconstituted banana which had been treated with sucrose and to which enzyme had been added is essentially that of a fresh banana, while the banana reconstituted without enzyme addition is found to be palatable, but lacking in true, fresh banana flavor. The enzyme-treated banana which has not been soaked in the sucrose solution has only a very weak banana flavor. The natural color and consistency of the enzyme- and sucrose-treated reconstituted banana are found to be excellent.

*Example 2*

The procedure of Example 1 is repeated with the peeled banana fruit being reduced to a purée in a blender instead of being dried in the form of slices. The flavor of the enzyme- and sucrose-treated purée is found to be essentially that of a fresh banana, while the enzyme-treated reconstituted purée without sucrose soaking and the sucrose-treated purée which contains no enzymes lack this fresh banana flavor.

*Example 3*

650 g. of bananas are peeled and sliced transversely to the long axis of the banana into ⅛-inch slices. The 480 g. of slices so obtained is soaked for 30 minutes in a 70% sucrose solution containing 0.5% of ascorbic acid. The slices are drained for 30 minutes after removal from the sucrose solution. The drained slices are placed in a forced draft oven at a temperature of 155° F. and dried for 24 hours.

The peels are comminuted in a blender and 210 g. of water is added. The mixture is permitted to stand for 1 hour and then the supernatant liquid is separated from the solids by centrifugation. To the supernatant liquid is added 250 g. of acetone. The solution is agitated and then permitted to stand until a precipitate has formed. The precipitate is separated from the fluid by centrifugation and is dried under a pressure of 75 cm. of mercury.

Upon rehydration of 20 g. of the dried slices with 60 g. of water and the addition of 10 mg. of the dried enzyme, the resulting slices are found to have a flavor which is essentially that of fresh banana slices.

Similar results are obtained with other fruits as shown in the following examples:

| | Fruit | Enzyme Source |
|---|---|---|
| Example 4 | Pineapple | Crown and skin. |
| Example 5 | Strawberry | Crown petal. |
| Example 6 | Apple | Peel and core. |
| Example 7 | Blackberry | Crown petal. |
| Example 8 | Boysenberry | Do. |
| Example 9 | Raspberry (red and black) | Do. |
| Example 10 | Blueberry | Do. |
| Example 11 | Apricot | Skin. |
| Example 12 | Cherry | Stem. |
| Example 13 | Peach | Skin. |
| Example 14 | Plum | Do. |
| Example 15 | Pear | Skin and core. |

The enzyme-treated reconstituted products of this invention are suitable for consumption immediately after the enzyme has developed the flavor. Comparable results are achieved when glucose, fructose, maltose, lactose, sorbitol, mannitol, or dulcitol are used as sweetening materials in the foregoing examples. The products of these examples provide an excellent fruit sensation when the dried fruit and the enzyme are incorporated in prepared culinary mixes, such as those used to make cakes, cookies, frostings, ice cream, etc.

*Example 16*

A large ripe pineapple is obtained and the crown and skin are removed. The edible pulp is cut into small pieces, approximately ⅜" on a side. Sucrose is added to the chunks and they are freeze-dried as in Example 1. The drying requires about 12 hours.

The crowns, skin, and other waste material are macerated in a blender together with an equal weight of water. The slurry is permitted to stand for 1 hour, and the solid material is separated from the supernatant liquid by centrifugation. Enzyme is extracted from the liquid by the addition of 60% by weight of acetone to precipitate said enzyme and subsequent centrifugation. The precipitate so obtained is vacuum dried.

A pineapple-flavored cake is prepared by adding 27 g. of the treated pineapple to a commercially available yellow layer cake mix, sold under the trade-name of "Duncan Hines Deluxe." After the water has been added, 20 mg. of enzyme is added. A batter is prepared by mixing the ingredients for 3 minutes. The batter is poured into cake pans and baked for 25 minutes at 350° F. The cake is found to have a flavor entirely comparable to a similar cake made with fresh pineapple.

*Example 17*

The crown petals are removed from a quart of strawberries and the strawberries are then cut in half. The resulting pieces are then treated with sucrose and freeze-dried as in Example 1 for about 20 hours.

The crown petals are macerated in a blender and water is added. After standing for an hour the supernatant liquid is decanted and a weight of acetone is added equal to the weight of the solution. The resulting precipitate is vacuum dried.

A strawberry cake is prepared by adding 30 g. of the dried strawberry halves to a commercially available white layer cake mix, sold under the trade-name of "Duncan Hines Deluxe." After the water has been added, 15 mg. of enzymes is added and a batter is prepared by mixing the ingredients for 3 minutes. The batter is poured into pans and baked for 25 minutes at 350° F. A similar cake is baked, but without the addition of the 60 mg. of enzyme. The first cake is found to have a flavor entirely comparable to a similar cake made with fresh strawberries, while the second cake has a flavor more comparable to that of strawberry jam.

The product of this process may also be advantageously incorporated into a product wherein the fruit is eaten concurrently with the remainder of the food.

Thus, a strawberry shortcake product can be produced which supplies the user with a mix to produce the shortcake and also with dehydrated strawberries and enzyme to produce the topping. The fresh flavor of the product of this invention makes it possible satisfactorily to produce such a product.

The advance over the art having been described, what is claimed is:

1. The process of preparing a dehydrated banana capable of reconstitution to essentially its natural fresh flavor, said process comprising the steps of physically separating the edible fleshy portion of the raw banana from the waste materials, soaking said fleshy portion for at least about 20 minutes in a water solution of about 40% to 70% by weight of sweetening material selected from the group consisting of monosaccharides, disaccharides, and hexitols to infiltrate essentially the entire fleshy portion with said sweetening material, drying the sweetened fleshy portion to a moisture level of not substantially more than 15%, by weight, extracting flavorese enzymes from said waste materials by comminuting said waste materials, extracting said waste materials with water and precipitating said flavorese enzymes with a protein-precipitating reagent, and drying the extracted flavorese enzymes to a moisture level below about 5%, whereby the combination of the said sweetened dried fleshy portions and the dried flavorese enzymes in the presence of essentially the amount of water found naturally in the fleshy portion of said fruit reconstitutes said fruit with essentially its natural flavor.

2. The process of preparing a dehydrated banana capable of reconstitution to essentially its natural fresh flavor, said process comprising the steps of physically separating the edible fleshy portion of the raw banana from the waste materials, covering said fleshy portion for at least 20 minutes with about 20% to 25% by weight of solid sweetening material selected from the group consisting of monosaccharides, disaccharides, and hexitols to infiltrate essentially the entire fleshy portion with said sweetening material, drying the sweetened fleshy portion to a moisture level of not substantially more than 15%, by weight, extracting flavorese enzymes from said waste materials by comminuting said waste materials, extracting said waste materials with water and precipitating said flavorese enzymes with a protein-precipitating reagent and drying the extracted flavorese enzymes to a moisture level below about 5%, whereby the combination of the said sweetened and dried fleshy portions and the dried flavorese enzymes in the presence of essentially the amount of water found naturally in the fleshy portion of said fruit reconstitutes said fruit with essentially its natural flavor.

References Cited by the Examiner

UNITED STATES PATENTS

| | | | |
|---|---|---|---|
| 1,942,212 | 1/1934 | Heseltine | 99—94 |
| 2,065,863 | 12/1936 | Maudaus | 99—204 X |
| 2,192,041 | 2/1940 | Headland | 99—204 |
| 2,328,554 | 9/1943 | Hayman | 99—204 X |
| 2,451,313 | 10/1948 | Arengo-Jones | 99—204 |
| 2,592,332 | 4/1952 | Reale | 99—204 |
| 2,924,521 | 2/1960 | Hewitt et al. | 99—204 |

A. LOUIS MONACELL, *Primary Examiner.*